Feb. 5, 1929.  
F. S. GURDEN  
1,700,933  
ELECTRICAL GATE  
Filed July 8, 1925  
9 Sheets-Sheet 1

Frank S. Gurden, Inventor

Witnesses

By Richard B. Owen, Attorney

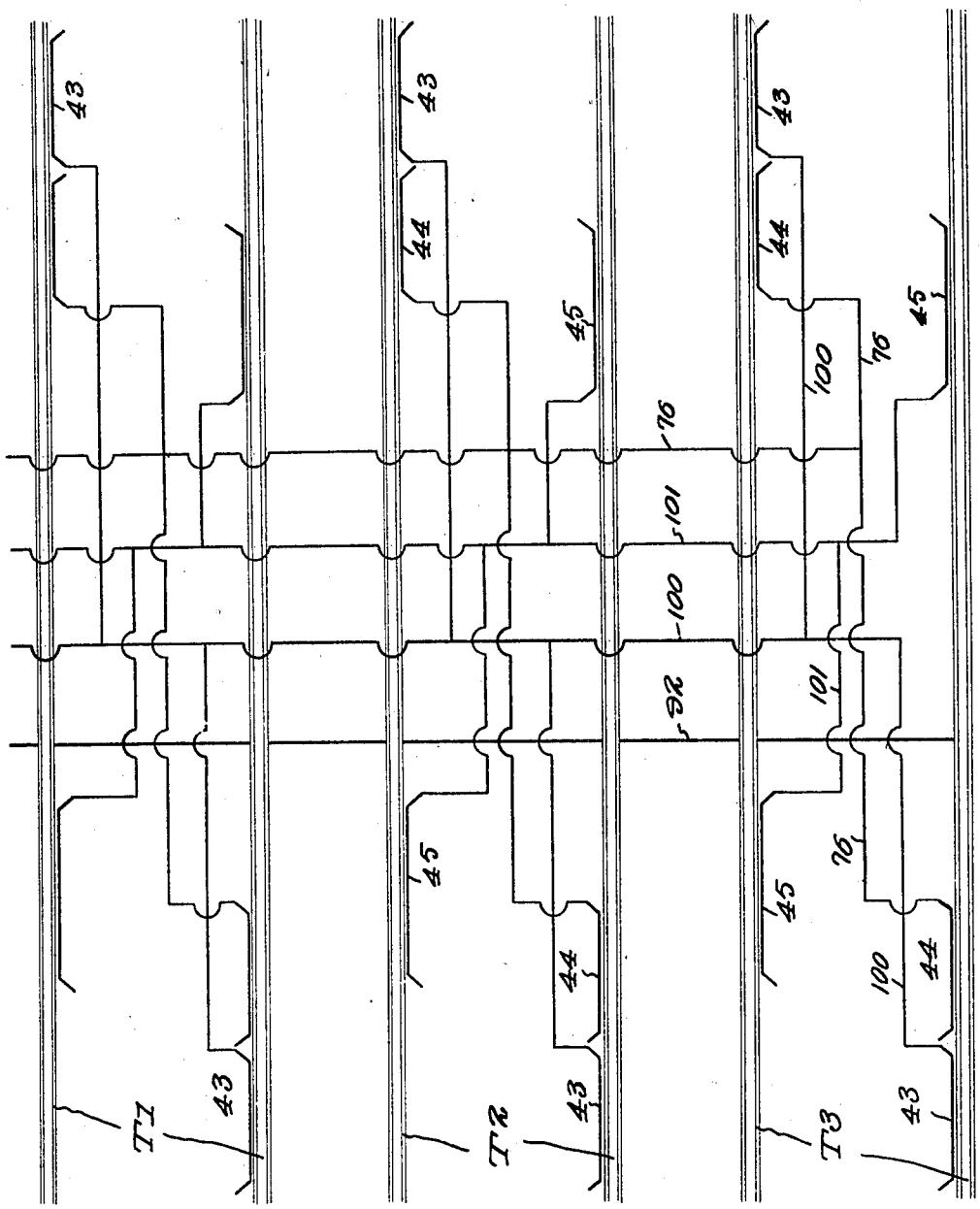

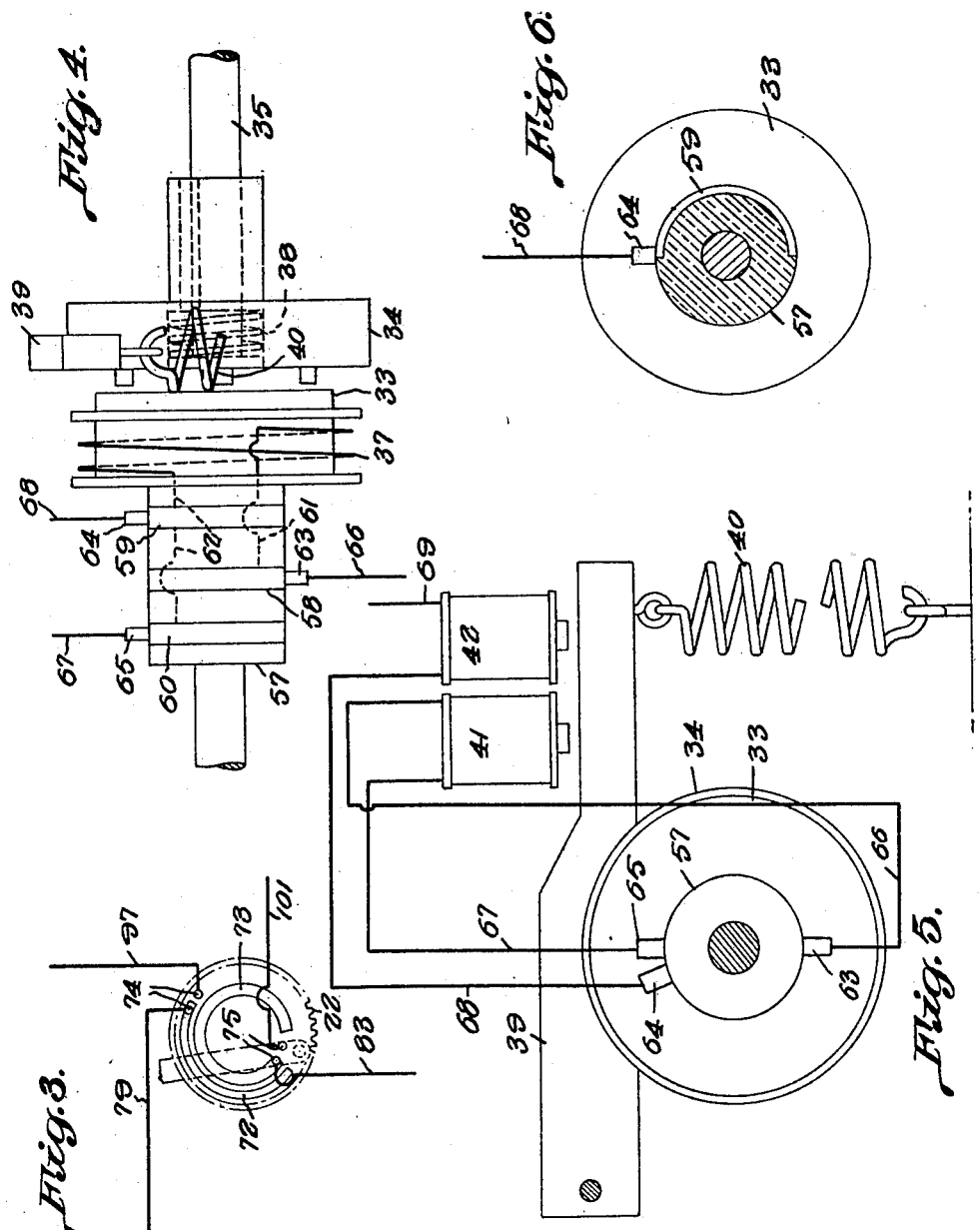

Feb. 5, 1929.  1,700,933
F. S. GURDEN
ELECTRICAL GATE
Filed July 8, 1925  9 Sheets-Sheet 4
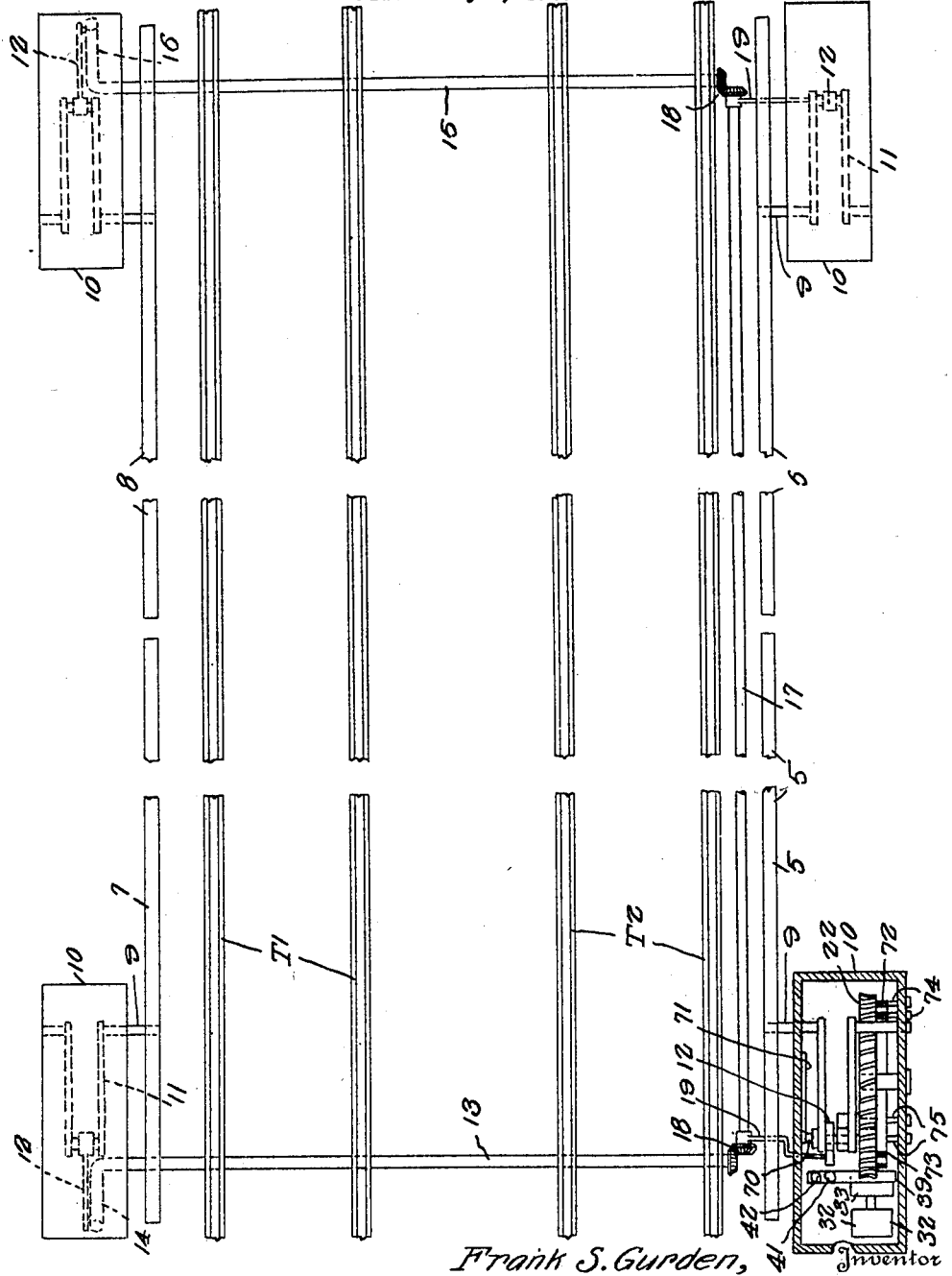
Frank S. Gurden, Inventor Feb. 5, 1929.　　　　　　　　　　　　　　　　　1,700,933
F. S. GURDEN
ELECTRICAL GATE
Filed July 8, 1925　　　　　9 Sheets-Sheet 5
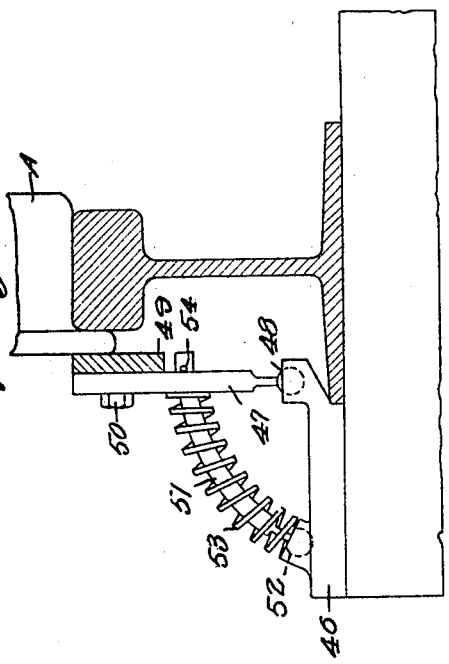
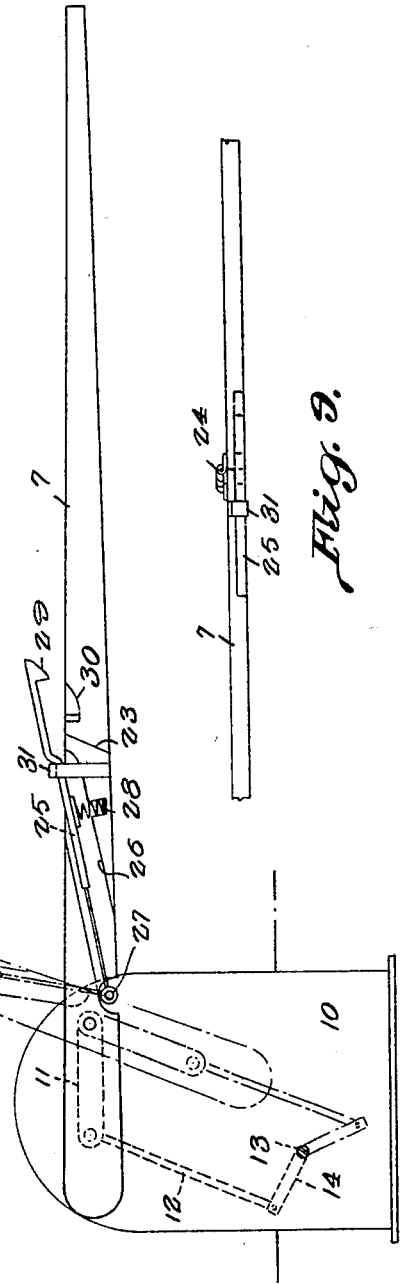
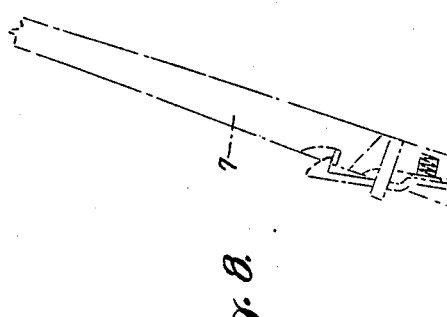
Frank S. Gurden, Inventor
Witnesses
By　　　　　Attorney

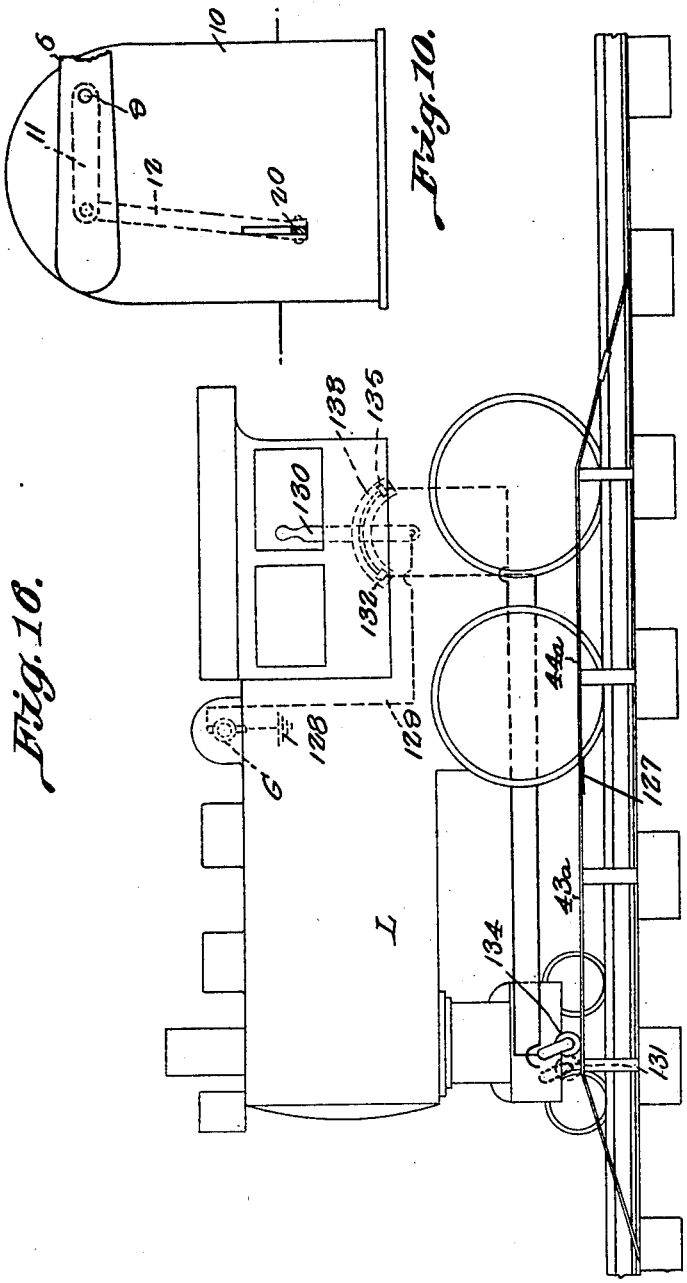

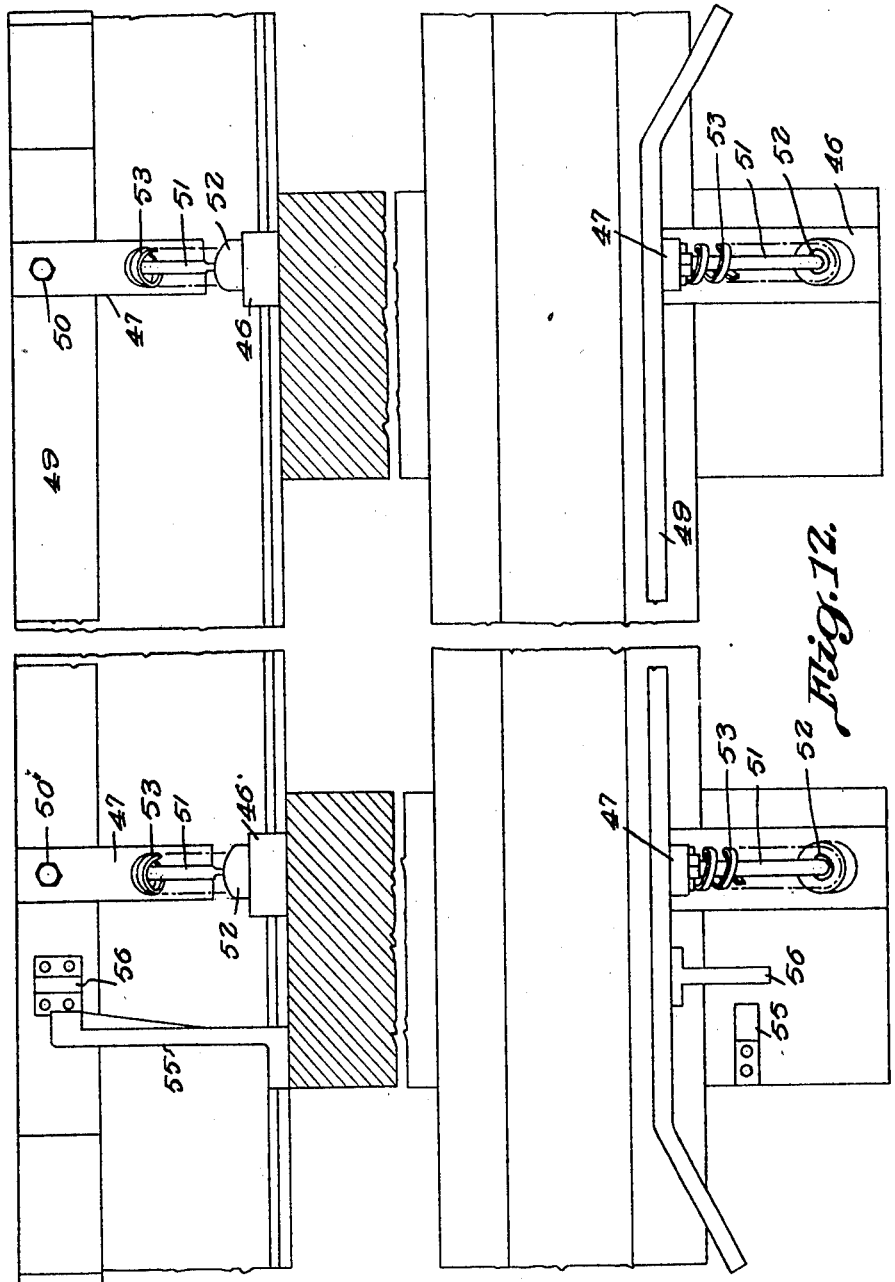

Feb. 5, 1929.  
F. S. GURDEN  
1,700,933  
ELECTRICAL GATE  
Filed July 8, 1925 9 Sheets-Sheet 8

Frank S. Gurden, Inventor

Witnesses

By Richard B. Owens

Attorney

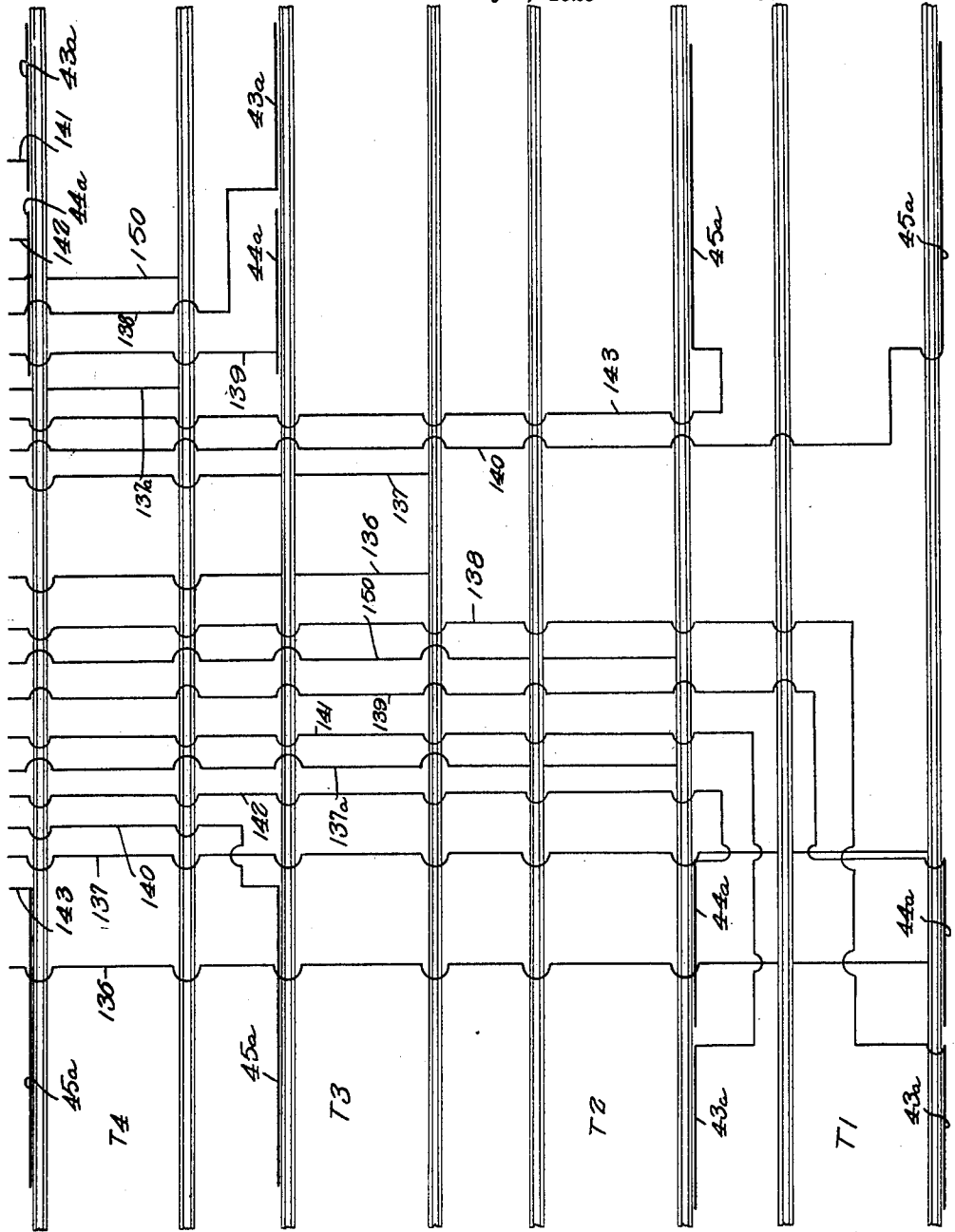

Patented Feb. 5, 1929.

1,700,933

UNITED STATES PATENT OFFICE.

FRANK S. GURDEN, OF CEDAR GROVE, LOUISIANA.

ELECTRICAL GATE.

Application filed July 8, 1925. Serial No. 42,297.

This invention relates to safety devices for railroad crossings, and has particular reference to an improved automatic train-controlled electrical gate operating apparatus for railroad crossings.

The primary object of the invention is to provide a gate operating apparatus of the above kind which is simple in character and efficient in operation.

Another object is to provide means to cause the gates to lower step by step so that objectional sudden complete lowering or closing thereof is avoided.

Still another object is to provide visual and audible signals on the gates and means to automatically render them operative at substantially all times except when the gates are in open position so that the likelihood of failing to observe impending danger is reduced to a minimum.

Further objects are to provide the gate operating apparatus with simple and effective controlling means adapted to be automatically rendered operative by the train or trains approaching the crossing, and to provide such controlling means that the gates cannot be opened by a train which has passed the crossing when another train is approaching the crossing.

Still further objects are to provide improved gates by means of which a vehicle will be allowed to continue over the crossing if caught between the gates after the latter have lowered and without danger of damaging the gates, and to provide for automatically preventing other vehicles from moving onto the crossing after the gates have lowered and the vehicle caught between the gates has continued over the crossing.

With the above general objects in view and others that will become apparent as the nature of the invention is better understood, the same consists in the novel form, combination and arrangement of parts hereinafter more fully described, shown in the accompanying drawings and claimed.

Figure 1:
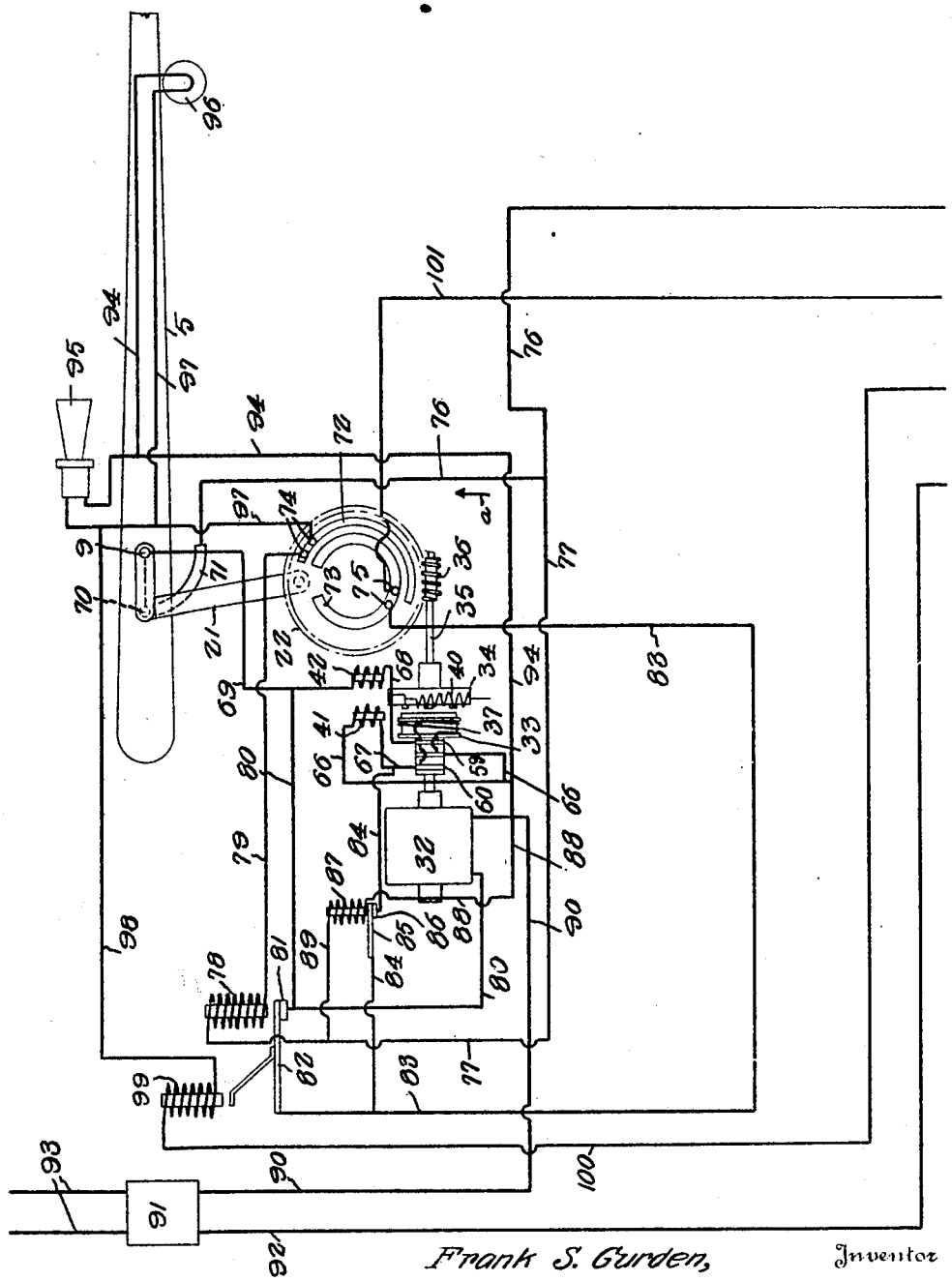
Figure 14:
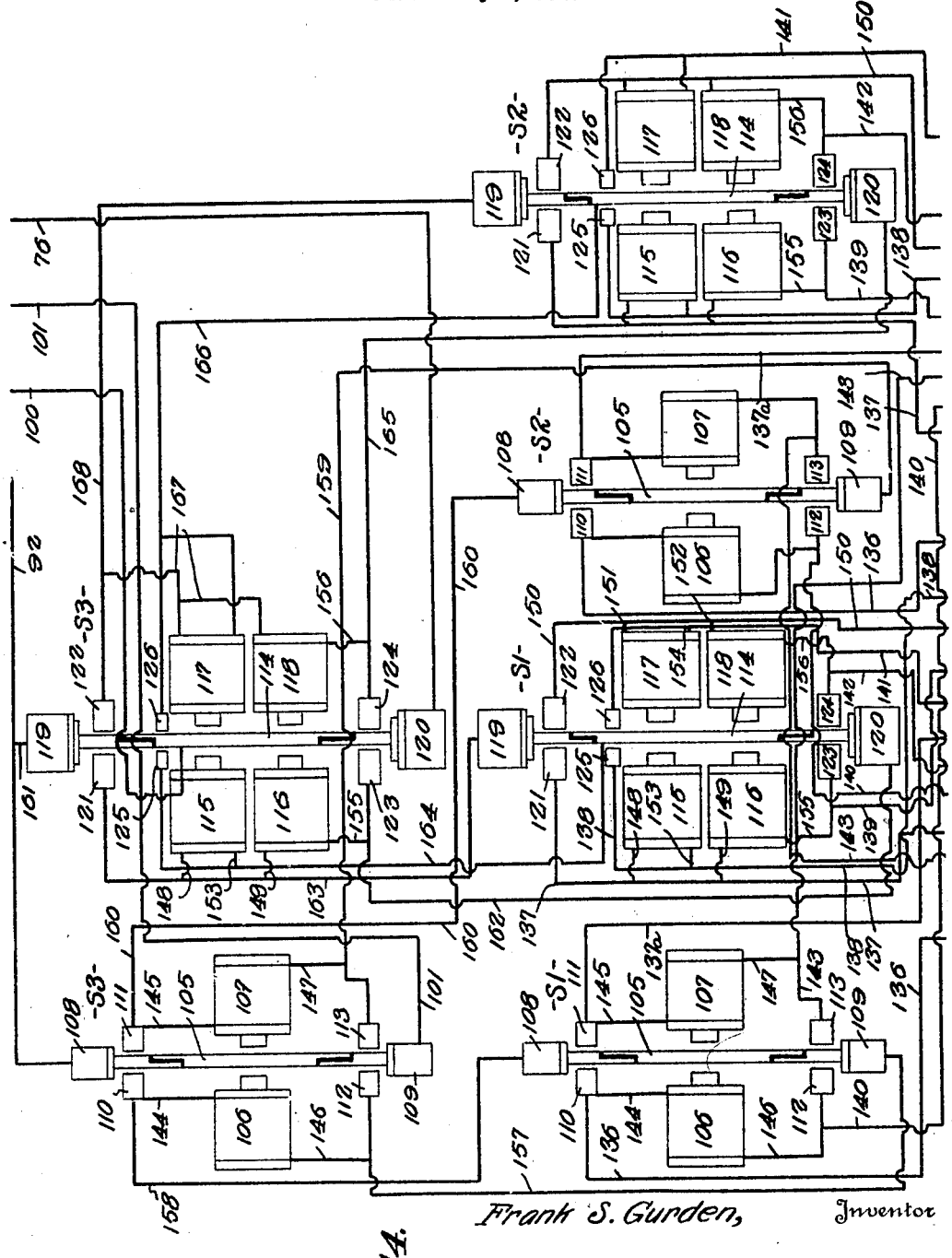

In the drawings, wherein like reference characters indicate corresponding parts throughout the several views, Figure 1 is a diagram showing one of the gates and associated parts together with the operating apparatus therefor, Figure 2 is a diagrammatic plan view showing one form of controlling means for the operating apparatus shown in Figure 1, Figure 3 is a diagrammatic view showing certain parts of Figure 1 in a different position, Figure 4 is an enlarged fragmentary side elevational view, partly diagrammatic, showing other parts of Figure 1 in detail, Figure 5 is substantially a view of the construction shown in Figure 4, looking toward the left of the latter, Figure 6 is a transverse section of the device shown in Figure 4, Figure 7 is a plan view, partly broken away and in section showing the gates in their operative relation and parts of the operating apparatus therefor, only two tracks being shown for the sake of simplicity, Figure 8 is a side elevational view showing one of the gates and its support, Figure 9 is a fragmentary top plan view of one of the gates, Figure 10 is a view somewhat similar to Figure 8 showing part of another one of the gates and its support, Figure 11 is an enlarged fragmentary longitudinal section showing one of the contact devices of the controlling means, Figure 12 is a top plan of the device shown in Figure 11, Figure 13 is a transverse section thereof, Figures 14 and 15 are diagrammatic plan views which, together, show another form of controlling means for the operating apparatus shown in Figure 1, and Figure 16 is a partly diagrammatic side elevation showing a locomotive upon a track beside which are disposed trolley wires of Figure 15, the locomotive being equipped to cooperate with the parts of the controlling means shown in said Figure 15.

As shown in Figure 7, four gates 5, 6, 7 and 8 are provided which are arranged in pairs at opposite sides of and parallel with the tracks $T^1$ and $T^2$, the outer end of each gate being secured on the inner end of a horizontal crank shaft 9 journaled in the sides of a hollow support or stand 10 whereby the gates are mounted for vertical swinging movement. The gates of each pair project toward each other so as to obstruct the crossing between the stands 10 when lowered.

The cranks 11 of the shafts 9 are arranged within the stands 10 and project outwardly, and the upper end of a pitman 12 is pivoted to each crank. A shaft 13 is suitably journaled under and transversely of the tracks so as to extend from a point adjacent the stand of gate 5 into the lower part of the stand of gate 7 where it is provided with a crank 14 to which the lower end of the adjacent pitman 12 is pivoted (Figure 8). In a like manner, a shaft 15 extends from the stand of gate 6 and projects into the stand of gate 8 where it has a crank 16 to which the lower end of the adjacent pitman 12 is pivoted, and a further shaft 17 extends from the stand of gate 5 to that of gate 6 and has its ends geared to the adjacent ends of shafts 13 and 15 by means of bevel gears as at 18. Secured on the ends of shaft 17 are arms 19 which project outwardly and the outer end of one arm is pivoted to the lower end of the pitman 12 of gate 5 while the outer end of the other arm is pivoted to the lower end of the pitman 12 of gate 6 as indicated at 20 (Figure 10). A further pitman 21 is pivoted to the crank of gate 5 and suitably journaled in the stand of the latter is a worm crank gear 22 to which is eccentrically pivoted the lower end of pitman 21. It is thus apparent that by turning the gear 22 all of the gates may be simultaneously raised or lowered.

As shown in Figures 8 and 9, each gate is composed of two normally coextensive sections, the adjacent ends of which incline downwardly and outwardly and are normally in abutting relation as at 23, said sections being hinged together as at 24 on an inclined axis coincident with the meeting ends of the sections. Thus the inner or free section of each gate may be swung outwardly relative to the outer section and when so swung will also rise so that it will normally tend to lower and swing inwardly by gravity. Thus, if a vehicle is caught on the crossing between the gates after the latter have been closed, such vehicle may continue over the crossing by forcing the free sections of the obstructing gates outwardly, and as soon as such vehicle has passed, such free gate sections will automatically return to their normal obstructing position.

A catch 25 is loosely disposed in a groove 26 formed in the inner side of the outer section of each gate, and the outer end of this catch is pivoted as at 27 to the adjacent gate stand while the free end portion of the catch is normally elevated by a spring 28 so that the hook or tooth 29 on the free inner end of the catch is normally positioned inwardly of and above a notch 30 formed in the adjacent outer end of the free inner section of the gate when the latter is lowered or closed. The upward movement of the catch is limited by a guide loop 31, and as the catch is inclined downwardly and outwardly, it will be seen that when the gate is opened or raised as indicated by dotted lines in Figure 8, the catch will be pulled outwardly and swung downwardly so as to cause the pawl 29 to engage the notch 30 whereby the free section of the gate is held in coextensive relation to the other section thereof. This action is partly due to the position of the pivot 27 inwardly of the axis about which the gate swings, and the desirability of thus preventing the free sections of the gates from automatically swinging outwardly as the gates are opened, is obvious.

An electric motor 32 is disposed in the stand of gate 5 and has a member 33 of an electromagnetic clutch secured on the armature shaft thereof, the other member 34 of the clutch being slidably keyed on a shaft 35 which has a worm 36 fixed thereon in mesh with the worm gear 22. The clutch member 33 embodies a coil 37 which, as in conventional clutches of this character, when energized will attract the clutch member 34 so that rotation of the motor shaft is transmitted to shaft 35. The clutch member is released by the spring 38 when the coil 37 is not energized, and disposed to engage the periphery of the member 34 is a hinged brake shoe 39 which is normally engaged by a spring 40. A pair of electromagnets 41 and 42 are arranged to attract and elevate the brake shoe 39, for releasing the latter whereby the shaft 35 may be rotated by motor 32 when the clutch is engaged, for causing rotation of gear 22 and consequent movement of the gates.

Disposed beside one rail of each track are similar contact devices 43, 44 and 45, the first two devices being located at one side of and some distance from the crossing, and the other device being located at the other side of the crossing. Disposed beside the other rail of each track are also similar contact devices arranged in reverse order so that the latter devices 43 and 44 are disposed at said other side of the crossing and the latter device 45 is disposed at said one side of the crossing (Figure 2). As shown in Figures 11 to 13 inclusive, each contact device embodies a pair of base plates 46 secured upon adjacent ties and having the lower ends of links 47 connected to the inner ends thereof by ball and socket joints 48, a bar 49 being horizontally disposed parallel with and beside the tread of the track rail and having the upper ends of the links 47 pivoted thereto as at 50 upon transverse axes. Curved rods 51 have their lower ends connected to the outer ends of the plates 46 by ball and socket joints 52, and these rods extend upwardly and inwardly and slidably project through the links 47. Helical compression springs 53 surround the rods 51 between the plates 46 and links 47 so as to yieldingly urge the latter and the bar 49 toward the rail, and cross pins 54 carried by the upper ends of the rods 51 limit movement of the links 47 in this direction so that the normal space between the tread of the rail and the bar 49 is slightly less than the thickness of the flanges of the wheels of the rolling stock or cars which run on the tracks. The ends of the bars 49 are directed away from the rail as shown clearly in Figure 12 to permit the wheel flanges to readily pass to the space between the rail and the bar. The links 47 are thus disposed in a normally vertical position, and carried by one tie near one end of the bar 49 is a contact 55. A further contact 56 is carried by the bar 49 so as to be normally spaced from the contact 55, and when the wheel flange passes between the rail and the bar 49, the latter will be moved in the direction of travel of the wheel so that contact 56 will be engaged with contact 55 when the wheel is moving in one direction but will not be so engaged when the wheel is moving in the other direction. Thus, the contact devices adjacent one rail of each track are each operable for closing a circuit only by cars moving in one direction and those adjacent the other rail of each track are operable for closing a circuit only by cars moving in the other direction.

As shown more clearly in Figure 4, the clutch member 33 has a hub 57 in peripheral grooves of which are arranged collector rings 58, 59 and 60, the rings 58 and 60 extending entirely around the hub and the ring 59 extending half way around the same as shown in Figure 6. One side of the coil 37 is connected as at 61 to the ring 58, and the other side of said coil is connected as at 62 to the rings 59 and 60. Brushes 63, 64 and 65 are arranged to respectively bear upon the rings 58, 59 and 60, and the brush 63 is connected by wire 66 to one side of magnet 41 whose other side is connected by wire 67 with the brush 65. Brush 64 is connected by wire 68 to one side of magnet 42, and the other side of the latter magnet is connected to the crank shaft 9 of gate 5 by means of wire 69, the crank of which shaft has a brush 70 arranged to ride on an arcuate conducting strip 71 secured to the inner side of the adjacent wall of the stand 10 of gate 5.

Arcuate conducting strips 72 and 73 are secured in concentric relation on one side of the worm gear 22 concentric with the axis of the latter, and disposed to engage the strip 72 are a pair of spaced brushes 74 carried by the stand of gate 5. This stand also carries a further pair of brushes 75 arranged to engage the strip 73, and when the gate is open one brush 74 is disengaged from strip 73 as shown in Figure 3, while the brush 70 is disengaged from the strip 71 when the gate is closed as shown in Figure 1. The strip 71 is connected by means of wires 76 and 77 to one side of an electromagnet 78 whose other side is connected by wire 79 to one of the brushes 74, and the wire 69 is connected by wire 80 to a terminal of motor 32. The wire 80 carries a contact 81 with which an automatic drop or armature 82 is normally engaged, and this drop is connected by wire 83 to one of the brushes 75. The wire 67 is connected to wire 83 by wire 84 in which is interposed an automatic drop or armature 85 normally engaging a contact 86, and disposed to attract the armature 85 for disengaging the latter from contact 86 is an electromagnet 87 one side of which is connected by wire 88 to the motor 32 and the other side of which is connected by wire 89 to wire 77. The wire 88 is connected by wire 90 to one side of a transformer or rectifier 91, the other side of which is connected by wire 92 which is connected to the rails of the tracks as shown in Figure 2, and 93 are the line wires of an ordinary alternating current lighting circuit, the current from which circuit is converted into direct current by the rectifier 91. A wire 94 connects wires 66 and 88 to one side of an electric horn 95 and one side of an electric lamp 96 which are suitably mounted on the gate 5, and the other sides of the horn and lamp are connected by wire 97 to the other brush 74. The wire 97 is connected by wire 98 to one side of an electromagnet 99 whose other side is connected by wire 100 to the contacts 55 of all of the rail contact devices 43. The electromagnets 78 and 99 are arranged to attract the drop 82 for disengaging the latter from contact 81, and the other brush 75 is connected by wire 101 to the contacts 55 of all of the rail contact devices 45. The wire 76 connects wire 77 and conducting strip 71 to the contacts 55 of all of the rail contact devices 44.

Assuming that the gates are open as shown by dotted lines in Figure 8, the gear wheel 22 would be one half revolution ahead of its position in Figure 1 so that an end of the conducting strip 72 would stand disengaged from one brush 74 as shown in Figure 3, the circuit of the lamp and horn being open. Assuming that a train is approaching the crossing on track T³ from the left of Figure 2, contact would first be made with contact device 43 and the current would then flow by way of wire 100 to magnet 99 which would pick up the automatic drop 82 so that the current would pass on through to the light and the horn and then back to the track by way of wires 94 and 90, transformer 91 and wire 92. By means of the rectifier, the current to operate the device is taken from an alternating current lighting circuit and converted into direct current, eliminating the necessity of using and the cost and upkeep incurred by using storage batteries. The current flows from wire 92 to the rails and then from contact 56 to contact 55 of the contact device 43, completing the circuit. The car wheels then close a circuit by engaging the rail contact device 44, the circuit then being through wire 76 by way of the arrow a (Figure 1), contact plate 71, brush 70, shaft 9, and then wires 69 and 80 to the motor, completing the motor circuit. The current also shunts through magnet 42 and wire 68 to brush 64, and from the brush 64 the current flows to contact ring 59 through wire 62, coil 37, contact ring 58, brush 63 and wire 66. The fact that contact ring 59 only extends half way round the hub of clutch member 33 causes brush 64 to make and break the clutch and brake magnet circuit so that the gates come down or lower step by step. At the same instant that the current is supplied through wire 76, it shunts through wire 77, wire 89, magnet 87, wire 88, completing the circuit through wire 90 to transformer 91. The purpose of magnet 87 is to lift the drop 85 for breaking the circuit in wire 84 so that the current cannot shunt back through wires 83 and 101 to contact devices 45, in which case there would be a short circuit when the car wheels engaged contact devices 45. When the motor 32 operates and the gates start to lower, contact plate 72 on gear wheel 22 closes the circuit through brushes 74 with wire 79 and wire 97 to the light and the horn, and this permits passage of current through magnet 78 which holds the automatic drop 82. The gates and the motor stop when the gates are closed and the motor circuit is broken through brush 70 leaving the conducting plate 71 as shown in Figure 1, the circuit to the light and horn being closed through brushes 74 and conducting plate 72 so that the current passes through magnet 78 which holds the automatic drop 82 elevated.

The purpose of magnets 99 and 78 is to open the circuit through the automatic drop 82. When drop 82 connects wire 80 with wire 83, the circuit of rail contact devices 45 is completed as the car wheels strike the latter and after all car wheels have left contact devices 43 and 44. When all wheels have left the contact devices 43 and 44, the circuit through the magnets 99 and 78 is broken, allowing drop 82 to lower and to connect wires 83 and 80.

The reason for keeping the circuit of wire 101 open until after the car wheels pass the contact devices 43 and 44 is so that the gate will not open until the last car of the train has nearly passed the crossing. When the automatic drop 82 makes contact with contact 81 of wire 80 and the car wheels have closed the circuit at contact device 45, magnet 87 is not energized and drop 85 contacts the contact 86 of wire 84, current passing through wire 83, through drop 82, wire 80, motor 32, wires 88 and 90, rectifier 91 and wire 92 to the rails, completing the motor circuit. At the same instant, current shunts through wire 84, drop 85, wire 67, brush 65, contact ring 60, wire 62, coil 37, wire 61, brush 63, wire 66, allowing current to return through wire 90 to rectifier 91 and by way of wire 92 to the rail, completing the circuit of the clutch, the current which flows through wire 84 to the brush 65 also flows through wire 67 to magnet 41 and back to line 90 through wire 66' thus holding the brake magnet energized to hold the brake free of the clutch 34 allowing the gate to rise without any pauses. When the gate is in its highest position the circuit is open between brushes 75 by reason of the position of conducting strip 73 as shown in Figure 3, the brake shoe 39 being then applied for holding the gate in raised position. Assuming that this same train approaching the crossing on track $T^3$ from the left is nearly across the crossing, and it should meet a train coming from the opposite direction on track $T^2$ or $T^1$, the train on track $T^3$ would ordinarily act to then open the gate when the circuits were opened at contacts 43 and 44 and closed at 45 of track $T^3$. However, if the train on track $T^1$ or $T^2$ is within dangerous distance of the crossing, it would close the same circuits at contacts 43 and 44 of track $T^1$ or $T^2$, and the train of track $T^3$ would have no control of the gate through the contact 45 of track $T^3$. Thus, if the train is just completing the crossing on track $T^3$, the train on track $T^2$ or $T^1$ is the one that controls opening of the gate after the train on track $T^3$ has closed it. Assuming that the same train approaching on track $T^3$ from the left pulls half way across the crossing and is then moved back or to the right, the gate will not be opened as the contacts 43, 44 and 45 adjacent one rail of track $T^3$ are only operable for closing circuits by trains moving to the right of Figure 2, while the similar contacts adjacent the other rail of track $T^3$ are reversely arranged. The action of one set of contact devices is thus reversed relative to the action of the other set for each track.

By disregarding Figure 2, and placing Figure 15 at the bottom of Figure 14 and Figure 14 at the bottom of Figure 1, a modification of the invention will be apparent, wherein contact devices are associated with four tracks and the locomotive generator is adapted to furnish the current to operate the gates as illustrated in Figure 16. When this modified construction is employed, using the locomotive generator, the transformer, or rectifier, 91 and the outside current source coming in through the lines 93 are eliminated and the lines 90 and 92 are connected together. In this modification of the invention, I make use of three similar devices $S^1$, $S^2$ and $S^3$ which I term subtracting switches because both the positive and negative sides of circuits are made and broken by their use. Each subtracting switch embodies a switching device including an armature bar 105 at one side of which is an electromagnet 106 and at the other side of which is a similar electromagnet 107, a contact 108 being disposed at one end of the bar 105 and a contact 109 being disposed at the other end of said bar. At opposite sides of the ends of the bar 105 are contacts 110, 111, 112 and 113. Each subtracting switch further embodies another switching device including an armature bar 114 at one side of which are electromagnets 115 and 116 and at the other side of which are electromagnets 117 and 118, a contact 119 being disposed at one end of the bar 114 and a contact 120 being disposed at the other end of said bar 114. At opposite sides of the ends of bar 114 are contacts 121, 122, 123 and 124, and at opposite sides of the end of bar 114 with which is associated the contact 119 are further contacts 125 and 126.

As shown in Figure 15, contact devices, 43ª, 44ª and 45ª are arranged adjacent one rail of each track respectively similarly to the arrangement of the devices 43, 44 and 45 in Figure 2, the devices 43ª, 44ª and 45ª of tracks T¹ and T² being disposed reversely to those of tracks T³ and T⁴. However, another set of these contact devices may be reversely arranged beside the other rail of each track as taught in Figure 2 in case traffic moves in both directions on each track of Figure 15, the arrangement shown in the latter figure being particularly for cases where traffic moves only to the right on tracks T¹ and T² and only to the left on tracks T³ and T⁴.

The contact devices 43ª and 44ª of each rail may embody low trolley wire sections mounted beside and parallel with the rail as shown in Figure 16, the wire sections being disposed in tandem relation with their adjacent ends connected together by an insulating coupling 127. The contact device 45ª of each rail will be of similar form except that the trolley wire will be in one section instead of two insulated sections.

Referring to Figure 16, the locomotive —L— has one side of its generator G grounded as at 128 and the other side of the same is connected by wire 129 to the forward and reverse lever 130. A collector wheel 131 is carried by the locomotive at the right hand side of the latter so as to ride onto the contact devices shown in Figure 15, and is connected to a contact 132 which is disposed at the forward end of the segment 133 of lever 130 so as to be engaged by the latter when the same is swung forwardly to cause forward travel of the locomotive, whereby current may flow from the generator to the wheel 131. When contact devices are also used adjacent the other rails of the tracks, a further wheel 134 may be mounted at the left hand side of the locomotive to cooperate therewith, and this wheel 134 will be connected by a wire to a contact 135 which is disposed at the rear end of segment 133 so as to be engaged by the lever 130 when the latter is swung rearwardly to cause rearward travel of the locomotive, whereby the current may then flow from the generator to the wheel 134.

Again referring to Figures 14 and 15, it will be seen that the rails of track T¹ are connected by wire 136 to contact 110 of switch S¹ and by wire 137 to contact 121 of switch S¹. The contact device or trolley wire section 43ª of track T¹ is connected by wire 138 to contact 125 of switch S¹, and contact device 44ª of track T¹ is connected by wire 139 to contact 123 of switch S¹, while contact device 45ª of track T¹ is connected by wire 140 to contact 112 of switch S¹. Wire 141 connects contact devices 43ª of track T² to contact 126 of switch S¹, wire 142 connects contact device 44ª of track T² to contact 124 of switch S¹, and wire 143 connects contact device 45ª of track T² to contact 113 of switch S¹. Wire 150 connects the rails of track T² to contact 122 of switch S¹ and is shunted as at 151 and 152 to magnets 117 and 118 of the latter, and wire 137ª connects the rails of track T² to contact 111 of switch S¹. The contact devices of tracks T³ and T⁴ are respectively similarly connected to corresponding parts of switch S², and the contact 110 of each subtracting switch is connected by wire 144 to magnet 106 thereof while wire 145 connects the contact 111 of each subtracting switch to the magnet 107 thereof. In a like manner, wires 146 and 147 respectively connect the magnets 106 and 107 of each subtracting switch to the contacts 112 and 113 thereof, while wires 137 are shunted as at 148 and 149 to magnets 115 and 116 of their respective subtracting switches. Wires 138 and 141 are respectively shunted as at 153 and 154 to the magnets 115 and 117 of their respective subtracting switches, and the contacts 123 and 124 are connected as at 155 and 156 to the magnets 116 and 118 of their respective subtracting switches. Contact 109 of switch S¹ is connected by wire 157 to contact 112 of switch S³, contact 108 of switch S¹ is connected to contact 110 of switch S³ by wire 158, contact 109 of switch S³ is connected to wire 101, contact 113 of switch S³ is connected to contact 109 of switch S² by wire 159, contact 108 of switch S² is connected by wire 160 to contact 111 of switch S³, contact 108 of switch S³ is connected to wire 92 which is shunted as at 161 to contact 119 of switch S³, contact 120 of switch S¹ is connected by wire 162 to contact 123 of switch S³, contact 119 of switch S¹ is connected by wire 163 to contact 121 of switch S³, and wire 163 corresponds to wire 137 of switch S¹. Bar 114 of switch S¹ is connected by wire 164 to contact 125 of switch S³ and corresponds to wire 138 of switch S¹, contact 120 of switch S³ connects to wire 76, contact 120 of switch S² is connected by wire 165 to contact 124 and magnet 118 of switch S³, bar 114 of switch S² is connected by wire 166 to contact 126 and magnet 117 of switch S³, magnets 117 and 118 of switch S³ are connected by wire 167 to wire 168 which connects contact 119 of switch S² to contact 122 of switch S³, and bar 114 of switch S³ connects to wire 100.

It will be seen that twenty wires lead to the subtracting switches S¹ and S² from the contact devices of the four tracks and but four wires lead to the operating mechanism of Figure 1 from switch S³ after the latter is properly connected to the switches S¹ and S².

Assuming that the locomotive is moving towards the crossing on track T¹ of Figure 15 from the left, its right hand trolley wheel 131 makes contact with trolley wire 43ª so that the current passes through wire 138, shunting through magnet 115 of switch S¹ back to the rails of track T¹ by way of wire 137 so that said magnet 115 attracts the adjacent bar 114, making it contact with the adjacent contact 125, sending the current through wire 164 to the subtracting switch S³, shunting the current through magnet 115 of the switch S³, shunting the current through to wire 163 so that the latter magnet 115 attracts the adjacent bar 114 for closing the circuit at the adjacent contact 125, sending the current through wire 100 to the light and horn. The current returns by wires 94, 90 and 92 to contact 119 of switch S³ through the adjacent contact 121, through wire 163, through contact 119 of switch S¹ to the adjacent contact 121 and then by way of wire 137 to the rail of track T¹, completing the circuit of the light and horn. Magnet 115 of subtracting switch S¹ attracts the adjacent bar 114 which closes a circuit including wire 137 and it also closes the return circuit through contact 119 of subtracting switch S¹ so as to send the current on to the subtracting switch S³ where the same action takes place so as to close the return circuit at the same instant. When the wheel 131 then engages rail contact or trolley wire 44ª which connects with wire 139, the current shunts through magnet 115 of switch S¹, attracting the adjacent bar 114 so that the current passes through the adjacent contact 123 to the subtracting switch S³, shunting through the magnet 116 of the latter for attracting the adjacent bar 114 and closing the return circuit by contact 125 so that the current is sent through contact 120 of switch S³, through wire 76, completing the circuit and causing the gate to close. The trolley wheel then makes contact with trolley wire 45ª and has the same action as hereinbefore described in the light and horn circuit and in the gate closing circuit when dealing with the contact 125 of Figure 2. If one train closes a circuit at 43ª or 44ª, no other train can close a circuit because the magnets in Figure 14 are of equal strength and if one magnet has attracted and is holding its associated bar 114, another opposed magnet is not strong enough to release the bar. In other words, assuming that the locomotive approaching the crossing from the left on track T¹ has effected closing of the gate and is just about to engage its trolley wheel with trolley wire 45ª to close the circuit whereby the gate is opened, and a train now approaches the crossing from the right on track T⁴ and closes a circuit at trolley wire 43ª or 44ª, the current passes through to the automatic drop 82 and the train on track T¹ is powerless to move the gates. Also, the generators of the two trains are out of parallel so that short circuiting is prevented. Supposing that the trolley wheel of the locomotive on track T¹ has engaged the trolley wire 45ª thereof and is causing opening of the gate, the horn and light will not be affected as they are not connected in the closed circuit, but the locomotive approaching on track T⁴ from the right would close the circuit of the horn and light and break the circuit on track T¹ through the automatic drop 82, the brush 70 being moved on to contact plate 71 so as to close the circuit for causing the gate to return to its closed position.

From the foregoing description it is believed that the construction and operation as well as the advantages of the invention will be readily understood and appreciated by those skilled in the art.

Minor changes may be made without departing from the spirit and scope of the invention as claimed.

What I claim as new is:

1. In a safety device for railroad crossings, a plurality of gates operatively connected together whereby the same will be simultaneously opened and closed when one gate is operated, and train-controlled operating means for opening and closing said one gate, said gate operating means embodying a motor having a rotatable drive shaft, a driven shaft, a normally released electromagnetic clutch energized simultaneously with the energization of said motor and operable when engaged to transmit rotation from said motor shaft to said driven shaft, a normally applied brake element associated with said driven shaft, electrical means to automatically release said brake element when the clutch is engaged, and means operatively connecting said driven shaft to the gate.

2. In a safety device for railroad crossings, a plurality of gates operatively connected together whereby the same will be simultaneously opened and closed when one gate is operated, and train-controlled operating means for opening and closing said one gate, and means to intermittently render the operating means inoperative when closing said gate whereby the gates are closed step by step, and means to render the operating means continuously operative when opening said gate.

3. In a railroad crossing safety device, a plurality of gates operatively connected together whereby the same will be opened or closed when one of the gates is operated, an operating motor associated with said one of the gates, means whereby an unbroken supply of current may be caused to be delivered to the motor through the operation by an approaching train of suitable control elements, an electric clutch between said motor and said one gate. and means for intermittently supplying current to said clutch while the motor is operated, to make and break connection between the motor and the gate, substantially as and for the purpose set forth.

4. In a railroad crossing safety device, a plurality of gates, operatively connected together whereby the same will be opened or closed when one of the gates is operated, an operating motor associated with said one of the gates, an eccentric crank element connected with a supporting pivot shaft of said one gate to turn the same, means controlled by a train for supplying current to said motor, an electric clutch element arranged between said motor and said eccentric element, said clutch being energized simultaneously with the energization of said motor, and means for intermittently breaking the current supply to the clutch.

5. In a railroad crossing safety device, a plurality of gates, operatively connected together whereby the same will be opened or closed when one of the gates is operated, an operating motor associated with said one of the gates, an eccentric crank element connected with a supporting pivot shaft of said one gate to turn the same, means controlled by a train for supplying current to said motor, an electric clutch element arranged between said motor and said eccentric element, said clutch being energized simultaneously with the energization of said motor, means for intermittently breaking the current supply to the clutch, and means carried by said one gate and interposed in the current supply line to said motor, whereby said supply line will become broken when the gate reaches its lowered position.

6. In a railroad crossing safety device, a gate mounted to swing vertically to obstruct or open a crossing, operating crank connected to said gate, a gear having one end of a connecting rod eccentrically pivotally secured thereto, a motor element having a shaft operatively connected to said gear to revolve the same, contact means operated by a train after the train has passed a fixed point, for supplying energy to said motor to operate the same for the closing of said gate, means carried by the gate for opening the motor circuit when the lowered position has been reached, means operable by said train supplying current to the motor through another circuit, to operate the same for opening the gate and means for preventing said other circuit from being closed until the train has passed said fixed point, said circuit closure preventing means being controllable by a train upon an adjacent track to prevent the closing of said other circuit, even though said first train be past said fixed point.

7. An electric control system for an electrically operated railway gate wherein separate circuits are employed for opening and closing the gate, comprising a pair of electric circuits each including a switch controlled from a track line and each adapted to operate one of the gate-controlled circuits, a second pair of electric circuits each including a switch controlled from an adjacent track line and each adapted to operate one of the gate-controlled circuits, an electromagnetically controlled switch associated with each pair of circuits and common to each to open or close the same, and electro-magnets in each circuit of each pair of circuits arranged to act on an electro-magnetically controlled switch to place one circuit of one pair in control of a gate-controlling circuit over the pair of circuits leading from the adjacent track.

8. A two-track electric control system, for electrically operated railway gates, wherein an alarm circuit, a gate opening and a gate closing circuit are employed, comprising a pair of circuits for each of the three-mentioned circuits one circuit of each pair leading from a track, train-operated means for successively closing the circuits along a track, means common to the pairs of alarm and gate-closing circuits, and operable simultaneously with the closing of one of the circuits of one pair by a crossing approaching train, whereby said train will control the associate alarm of gate-controlled circuit over a train on an adjacent track, and means associated with the alarm and gate-closing circuits whereby the train on the adjacent track may take control and prevent the closing, by the first mentioned train, of the gate opening circuit.

9. An electrical control system for an electrically operated railway gate and for use in connection with a four-track line, wherein the gate structure includes an alarm circuit, a closing circuit and an opening circuit, comprising electric lines leading from each track to each of the three gate circuits, and means whereby, when a circuit is established through a line leading from one track to the alarm or gate-closing circuit, no circuit can be established through the lines of the other tracks through the alarm and gate-closing circuits.

10. An electrical control system for an electrically operated railway gate and for use in connection with a four-track line, wherein the gate structure includes an alarm circuit, a closing circuit and an opening circuit, comprising electric lines leading from each track to each of the three gate circuits, and means whereby, when a circuit is established through a line leading from one track to the alarm or gate-closing circuit, no circuit can be established through the lines of the other tracks through the alarm and gate-closing circuits, and means in said alarm and gate-closing circuits acting to prevent the closing of an opening circuit to any of the track lines so long as an alarm or gate-closing circuit is energized.

11. An electrical control system for an electrically operated railway gate for a pair of tracks, wherein a gate-closing and a gate-opening circuit is employed, comprising an electric line leading from each track to the gate-closing circuit, an electric line leading from each track to the gate-opening circuit, an electromagnetically operated switch in and common to those lines leading from the tracks to the gate-closing circuit, an electromagnetically operated switch in and common to those lines leading from the tracks to the gate-opening circuit, and means for completing an electric circuit through the electric lines at the track to actuate said switches to closed position in one or the other of the associate lines to give control of the gate-opening and closing circuits to one track line.

12. An electric railway gate operating system including a gate, an electric circuit controlling the closing of the gate, an electric circuit controlling the opening of the gate, means operable by a train on any one of a plurality of tracks for energizing either of said circuits, and means in the energized circuit controlling the closing of the gate whereby, upon its energization, similar train operable means on adjacent tracks will have no control over said circuit.

13. An electrically operated railway gate comprising a pivotally mounted gate member, an operating crank for the gate, an electric motor connected with said crank, train-operated means for energizing the motor, means for breaking the motor circuit upon the gate reaching the limit of its downward movement, train-operated means for re-energizing said motor to raise the gate, and means in and operated by the first motor circuit while energized for maintaining the second motor circuit open.

14. In a railway crossing gate, a means for actuating said gate from any one of a plurality of tracks, comprising a gear, a crank eccentrically connected to said gear and having connection with the crossing gate, an electric motor, a worm engaging said gear, an electric clutch arranged between said motor and said worm gear, a train controlled circuit designed to be closed by a train on any of the tracks for energizing said motor, means for energizing said clutch simultaneously with the motor to cause the rotation of said worm and gear for the closing of said gate, a brake element arranged to engage said clutch, an electromagnet energized by current flowing to the clutch and acting to hold the brake disengaged, and means for intermittently breaking the current supply to said clutch and simultaneously de-energizing said electro-magnet to permit the application of the brake to the clutch during the lowering of the gate.

15. In a railway crossing gate, a means for actuating said gate from any one of a plurality of tracks, comprising a gear, a crank eccentrically connected to said gear and having connection with the crossing gate, an electric motor, a worm engaging said gear, an electric clutch arranged between said motor and said worm gear, a train controlled circuit designed to be closed by a train on any of the tracks for energizing said motor, means for energizing said clutch simultaneously with the motor to cause the rotation of said worm and gear for the closing of said gate, a brake element arranged to engage said clutch, an electro-magnet energized by current flowing to the clutch and acting to hold the brake disengaged, and means for intermittently breaking the current supply to said clutch and simultaneously de-energizing said electro-magnet to permit the application of the brake to the clutch during the lowering of the gate, means for breaking said motor and electric clutch circuits upon the lowering of said gate and means operable after a predetermined period of time for re-energizing said motor and clutch to further rotate said gear for the raising of the gate.

16. In a railway crossing gate, a means for actuating said gate from any one of a plurality of tracks, comprising a gear, a crank eccentrically connected to said gear and having connection with the crossing gate, an electric clutch arranged between said motor and said worm gear, a train controlled circuit designed to be closed by a train on any of the tracks for energizing said motor, means for energizing said clutch simultaneously with the motor to cause the rotation of said worm and gear for the closing of said gate, a brake element arranged to engage said clutch, an electro-magnet energized by current flowing to the clutch and acting to hold the brake disengaged, and means for intermittently breaking the current supply to said clutch and simultaneously de-energizing said electro-magnet to permit the application of the brake to the clutch, during the lowering of the gate, and means in the first energized motor circuit whereby, upon the re-closing of this circuit, by a train on an adjacent track, the second energized motor circuit will be broken.

In testimony whereof I affix my signature.

FRANK S. GURDEN.